Sept. 22, 1970          J. J. BECKER          3,529,435

AIR COOLER FOR AUTOMOBILE

Filed Aug. 20, 1969          2 Sheets-Sheet 1

INVENTOR.
JOHN J. BECKER
BY *Golacheks & Saulsbury*
ATTORNEYS

Sept. 22, 1970 J. J. BECKER 3,529,435
AIR COOLER FOR AUTOMOBILE
Filed Aug. 20, 1969 2 Sheets-Sheet 2

INVENTOR.
JOHN J. BECKER
BY Placek & Saulsbury
ATTORNEYS

United States Patent Office 3,529,435
Patented Sept. 22, 1970

3,529,435
AIR COOLER FOR AUTOMOBILE
John J. Becker, Brooklyn, N.Y., assignor to Cheryl
Weiner, Los Angeles, Calif.
Filed Aug. 20, 1969, Ser. No. 851,566
Int. Cl. B60h 3/04; F25d 3/12
U.S. Cl. 62—244                                    9 Claims

ABSTRACT OF THE DISCLOSURE

An air cooler for an automotive vehicle includes an inverted container with open bottom disposed in a tray containing frozen carbon dioxide. The tray is detachably engaged with the container. Inner and outer walls of the container have continuous linings of metal foil. A metal tube is helically wound around the container and is seated in grooves in walls of the container. One end of the tube opens inside the container to pass carbon dioxide gas from the container. The other end of the tube is connected to a pipe opening external of the vehicle. A pipe connected to the tray drains water of condensation to the exterior of the vehicle. A bracket connected to the container permits it to be hung on the dashboard of the vehicle.

---

Prior air coolers for automobiles have been of three general types. In one type a rotating fan creates an air draft. This type is adequate for maintaining air circulation but cannot cool the air drawn in from outside the automobile if the outside air is warm or hot. A second type employs a compressor and refrigerant in a closed system to refrigerate the air circulated in the vehicle. In this type, the windows of the vehicle must be kept closed which is undesirable for proper fresh air circulation. In addition such an air conditioner is expensive to install and keep in good repair. It is not readily interchangeable from one automobile to another, and generally remains in place at all times where it restricts leg room and comfort of seated passengers. A rigid type employs ice or chilled water. Air is blown over the ice chilled water to cool the air. In such devices the ice melts very quickly and the chilled water warms up even more quickly so that adequate cooling is not maintained. Furthermore, the rate of cooling is not uniform. Other objections are to the use of blocks of ice which involves their heavy weight, bulk, high cost in relation to the amount of cooling provided, etc.

The present invention is directed at overcoming the above and other objections, difficulties and disadvantages of prior air coolers for automotive vehicles. According to the invention there is provided a device employing frozen carbon dioxide or Dry Ice as it is commonly known. The Dry Ice is contained in the air cooling device which is completely portable and easily removable from the vehicle. Air in the vehicle circulates outside a chilled helical conduit surrounding the container of the Dry Ice, and is cooled by direct conduction through the walls of the tube. The container is seated in a tray in which collects water condensing from the cooled air. This water is drained away. The removal of water from the air in the vehicle reduces humidity and increases comfort of passengers. This function supplements the cooling of the air by the device. The carbon dioxide circulating through the conduit is vented to the exterior of the vehicle. The container of carbon dioxide is lined on both sides with metal foil. The air circulating in the vehicle strikes the outer foil layer and is absorbed by direct conduction. The foil on the outside of the container is continuous with the foil on the inside so that the heat drawn from the air is conducted to the interior of the container. The container is preferably disposed adjacent to the air intake duct or vents of the passenger compartment of vehicle, so that when the vehicle is in motion the fresh air drawn into the passenger compartment is quickly, effectively and uniformly cooled by the device.

The invention will be explained in further detail in connection with the drawings, wherein.

Figure 1:
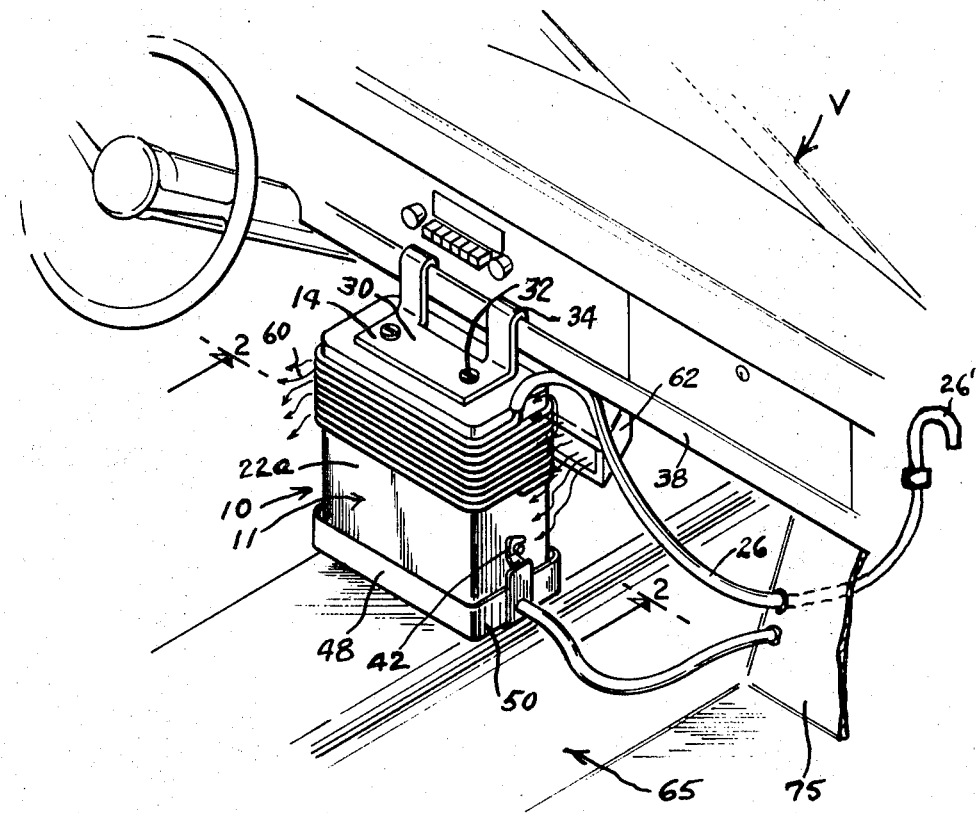
FIG. 1 is a perspective view of the air cooling device embodying the invention, shown installed inside an automotive vehicle.
Figures 2, 3:
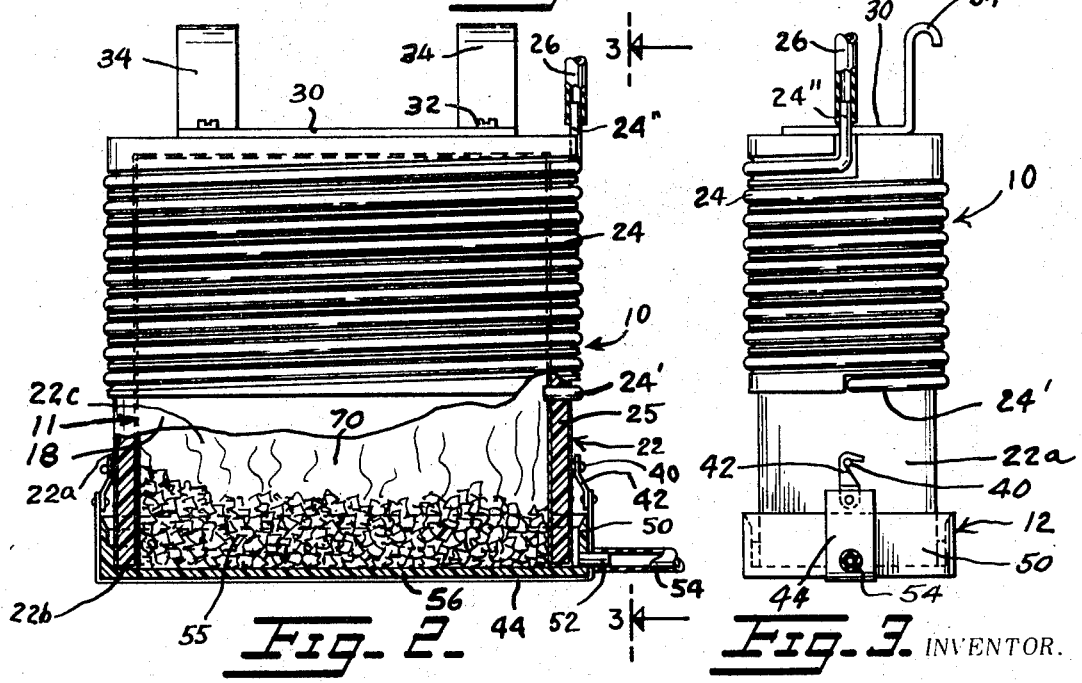
FIG. 2 is a side elevational view partially in section showing the device on an enlarged scale.
FIG. 3 is an end elevational view taken on line 3—3 of FIG. 2.
Figure 4:
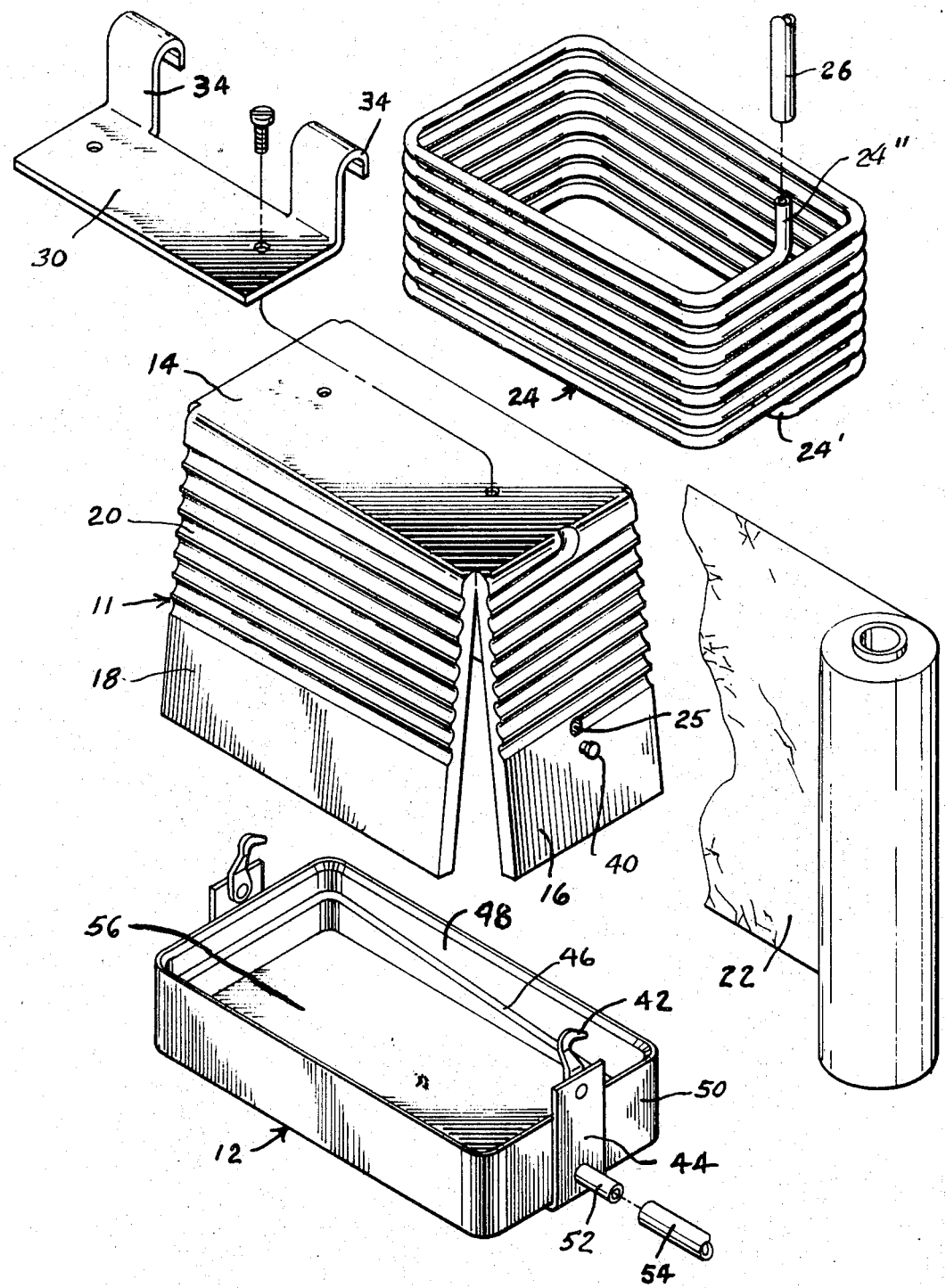
FIG. 4 is an exploded perspective view of parts of the device.

Referring to the drawing the device 10 includes a boxlike inverted container 11 open at the bottom and seated inside an open topped tray 12. The container has a closed flat top wall 14, end walls 16 and side walls 18. Grooves 20 best shown in FIG. 4 are formed in the outer sides of walls 16, 18. The container is preferably made of a thermally insulative material. A foil lining 22 is applied to both inner and outer sides of the container. The lining also covers the underside of top wall 14, as indicated by dotted lines in FIG. 2. A metal tube 24 is helically wound around the container and is seated in grooves 20. The lower end 24' of the tube opens into the interior of the container through hole 24 as clearly shown in FIG. 2. To upper end 24' of the tube is connected a flexible pipe 26 which opens into the outside atmosphere external of the vehicle. A bracket 30 is secured by screws 32 to the top of the container. This bracket is formed with hooks 34 which engage on ledge 36 of dashboard 38 of vehicle V. A pair of headed studs 40 are provided on opposite end walls 16 near their bottom ends. Hooks 42 are pivotally mounted at opposite ends of U-shaped bracket 44 and detachably engage on studs 40.

Bracket 44 supports the shallow tray 12. Ledges 46 formed at inner sides of the side walls 48 of the tray slant down toward end wall 50 where an outlet drain fitting 52 is located. A flexible pipe 54 is connected to fitting 52 to drain water from the tray and convey it outside the vehicle.

Dry Ice 55 in block or crushed form can be placed inside the container on tray 12. The bottom ends of the foil covered side and end walls 16, 18 rest inside the tray on bottom wall 56 as clearly shown in FIG. 2. The foil covering is interposed between ends of the side and end walls of the container so that the foil is continuous between the inside and outside of the container.

The device 10 is disposed in the path of air stream 60 as it leaves air duct 62 opening into the passenger compartment 65 of vehicle V.

In operation of the device, the air leaving duct 62 will circulate around the device. The heat in the air will be absorbed by outer foil lining 22a. This heat will be conducted via the lining portion 22b underlaying the bottom ends of walls 16, 18, to the inner lining portion 22c. There the heat will be absorbed by the mass of Dry Ice 55 and by the carbon dioxide vapor 70 arising from the frozen mass. The chilled carbon dioxide gas will pass out of the interior of the container to tube 24 and will circulate upwardly through the tube to chill the tube. The metal tube will be contacted by the circulating air stream 60 and will absorb heat therefrom. By the arrangement described heat in the air is absorbed by direct conduction. Water will condense on the exterior of tube 24 and on the outer foil lining portion 22a. This water will drain down gravitationally into tray 12 and will run off via fitting 52 and pipe 54. When the dry ice is entirely evaporated, it can be replaced by disengaging hooks 42 to release tray 12. Fresh Dry Ice can then be inserted into the bottom of the tray and the tray can be replaced. If desired, after hooks 42 are disengaged, container 11 can be lifted off of ledge 36 to expose the interior of the container for cleaning.

The device can readily be removed from the vehicle when air cooling is not required or for any other purpose. It will be noted that no structural changes are required in the vehicle to install the air cooling device. Pipe 26 may terminate in a hook portion 26' which can be hung at a partially opened window of the vehicle. Pipe 54 can be extended through a hole 73 in the front fire wall 75 to pass water from tray 12 out under the vehicle.

The container and tray can be made of suitable molded plastic material by conventional plastic molding machinery. The entire device can be manufactured at relatively low cost as compared with prior conventional air coolers. The device described will render long, trouble-free service.

What is claimed is:

1. An air cooling device for an automotive vehicle having a passenger compartment, comprising a box-like generally rectangular container having an open bottom and closed top, side and end walls; metal foil lining inner and outer sides of the side and end walls of the container, said foil extending around bottom ends of the side and end walls so that the foil is continuous between the outside and inside of the container to conduct heat from outside to the inside of the container; a shallow tray for containing frozen carbon dioxide, said container being disposed in said tray with bottom ends of the side and end walls resting inside the tray; bracket means disengageably holding the container and tray together; a thermally conductive tube helically coiled around the container, said tube opening at one end inside the container to receive gaseous carbon dioxide, said tube having an open other end to pass the gaseous carbon dioxide out of the tube; and pipe means connected to the tray to drain from the tray water condensing on the tube and foil lining of the walls of the container and flowing down into the tray.

2. An air cooling device as defined in claim 1, further comprising further bracket means attached to the container for supporting the same in said passenger compartment in the path of an air stream entering said compartment.

3. An air cooling device as defined in claim 1, wherein said container is made of thermally insulative plastic material so that heat is transferred between the outside and inside of the container by direct conduction via said foil lining.

4. An air cooling device as defined in claim 1, wherein the side and end walls of the container have external grooves, said tube having turns thereof seated in said grooves to retain the tube on the container.

5. An air cooling device as defined in claim 1, wherein said pipe means comprises a fitting opening into the tray, and a flexible pipe connected to said fitting.

6. An air cooling device as defined in claim 5, further comprising another flexible pipe connected to the other end of said tube for conducting the gaseous carbon dioxide outside of the passenger compartment after heat transferred from said air stream has passed through sides of said tube by direct conduction and has been absorbed by the gaseous carbon dioxide in the tube.

7. An air cooling device as defined in claim 6, further comprising further bracket means attached to the container for supporting the same in said passenger compartment in the path of an air stream entering said compartment.

8. An air cooling device as defined in claim 7, wherein said container is made of thermally insulative plastic material so heat is traneferred between the outside and inside of the container by direct conduction via said foil lining.

9. An air cooling device as defined in claim 8, wherein the side and end walls of the container have external grooves, said tube having turns thereof seated in said grooves to retain the tube on the container.

References Cited

UNITED STATES PATENTS

| | | | |
|---|---|---|---|
| 1,826,471 | 10/1931 | James | 62—244 |
| 2,016,428 | 10/1935 | Hasche | 62—387 |
| 2,580,210 | 12/1951 | Zuckerman | 62—387 |
| 3,164,971 | 1/1965 | Gentz | 62—244 |

WILLIAM J. WYE, Primary Examiner

U.S. Cl. X.R.

62—384, 387, 459